Nov. 11, 1930.   H. FORD   1,781,503
VEHICLE CONSTRUCTION
Filed April 18, 1929   2 Sheets-Sheet 1
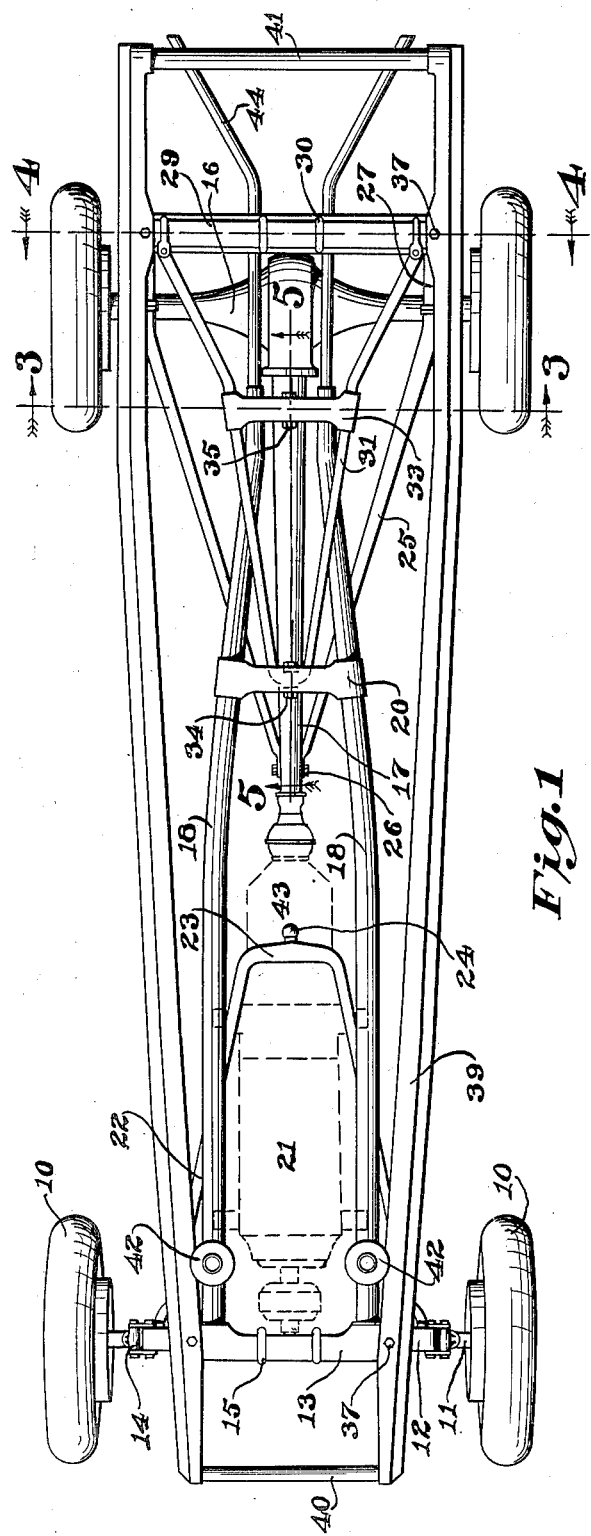
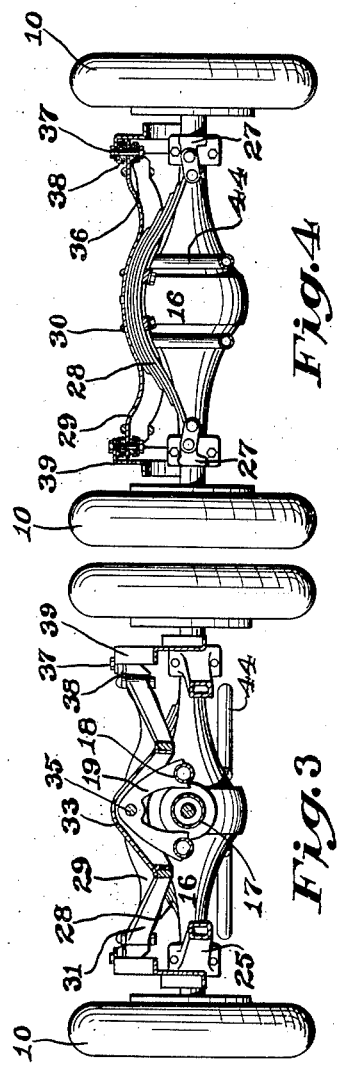
INVENTOR
Henry Ford.
BY C. R. Halbert.
E. L. Davis.
ATTORNEYS.

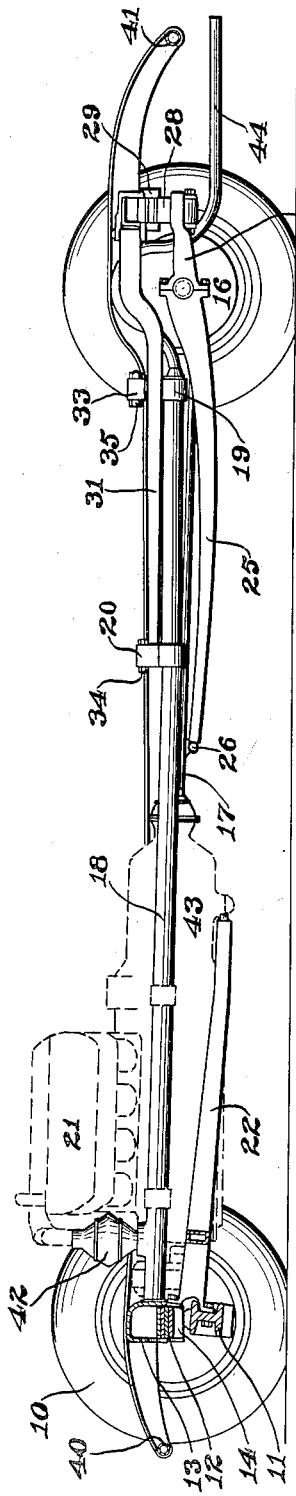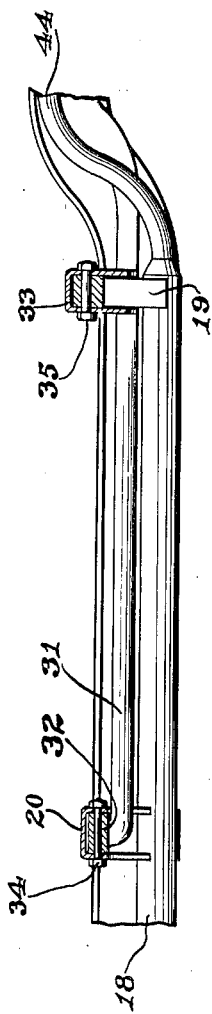

Patented Nov. 11, 1930

1,781,503

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

VEHICLE CONSTRUCTION

Application filed April 18, 1929. Serial No. 356,022.

The object of my invention is to provide a vehicle construction of simple, durable and inexpensive construction.

Still a further object of my invention is to provide a vehicle construction which will prevent the vibration produced by an automobile engine from entering the body associated therewith.

Still a further object of my invention is to provide an engine frame and front spring cross member unit and also a rear spring cross member pivotally connected to this engine frame unit, and to resiliently mount a body frame on these two cross members so that the body frame will be insulated from either cross member, and the front cross member and engine frame will be free to rotate independently of either the body frame or the rear spring cross member.

Still a further object of my invention is to provide what may be termed a chassis frame having two parts each comprising a triangular frame, the base of which forms either the front or rear frame cross member and wherein the apices of the triangle overlap and are pivoted together by means of spaced pivots, and to connect this chassis frame so formed through shock absorbing means with a body frame whereby the body frame may be largely isolated from chassis vibration and whereby the torque reactions of the engine may be taken entirely by the front section of the chasis frame without being transmitted to the rear section of the chassis frame or to the body frame to any appreciable extent.

Still a further object of my invention is to provide a chassis frame as distinguished from a body frame wherein the chassis frame consists of two triangular sections which may have their base members bolted to the springs of the vehicle and which may have their apices overlapped and each pivoted to the other whereby longitudinally spaced aligned pivot connections may be made between the two sections of the chassis frame.

Still a further object of my invention is to provide a chassis frame wherein the longérons consist of hollow tubular members, and to connect the exhaust manifold of the engine to the interior of these longérons through muffling devices whereby the cooling efficiency of the mufflers may be increased by being placed adjacent to the fan at the front end of the chassis and whereby the exhaust noises which are communicated to the body may be largely lessened.

Still a further object of my invention is to provide in combination with the construction just described means extended from the chassis frame rearwardly to conduct the exhaust gases beyond the rear end of the vehicle from the rear end of the chassis frame.

Still another object is to construct a chassis frame having transverse axles and transverse springs and having diagonal radius rods extending from the chassis to the ends of the axles in such a way that the rear radius rods may be extended to support the outer ends of the rear spring in position spaced rearwardly from the general plane of the rear axle.

Still a further object of my invention is to provide an automobile engine frame constructed from tubes extending rearwardly from the front spring cross member and to yieldingly support a body frame thereon, and to so construct this engine frame that the exhaust gases from the engine may be carried back by both of the tubular side frame members to the rear of the vehicle.

Still a further object of my invention is to provide a vehicle construction having a rear axle and a transverse spring resiliently supporting a body frame member, and an engine frame member pivotally connected to this transverse spring, the spring being placed rearwardly of the rear axle and the pivot connection to the engine frame consisting of a forked member straddling the enlarged portion of the rear axle to thereby make it possible to have a low body frame and yet allow a greater uninterrupted movement of the rear axle.

With these and other objects in view, my invention consists in the arangement, construction, and combination of the various parts of my improved device as described in the specification, claimed in the claims and illustrated in the accompanying drawings, in which:

Figure 1 shows a top or plan view of the frame construction of my improved vehicle.

Figure 2 shows a side elevation of the construction shown in Figure 1, parts being broken away to better illustrate the construction.

Figure 3 shows a sectional view taken on the line 3—3 of Figure 1.

Figure 4 shows a sectional view taken on the line 4—4 of Figure 1.

Figure 5 shows a sectional view taken on the line 5—5 of Figure 1.

Referring to the accompanying drawings, I have used the reference numeral 10 to indicate generally the wheels of a motor vehicle. The front pair of these wheels are pivotally mounted in the conventional manner on a front axle 11, and a transverse spring 12 connects this front axle with a front cross member 13 by means of spring perches 14 and U bolts 15.

The rear pair of wheels 10 are mounted in the conventional manner on a rear axle housing 16. A torque tube 17 extends forwardly from this rear axle housing and is universally connected with the rear end of an engine transmission 43.

A pair of tubular engine frame members 18 are rigidly secured to the front spring cross member 13 and extend rearwardly therefrom. The rear ends of these tubes 18 converge toward each other and are secured together by a connecting yoke 19 at a point slightly forward of the rear axle 16. A channel brace 20 is secured between the tubes 18, the yoke 19 and the front cross member 13. An engine 21 is mounted between the frame members 18 adjacent to the cross member 13.

The engine frame is of generally triangular outline, as just described, and consists of a separate and independent frame composed of two longitudinal tubular side members joined at their forward ends by cross member 13, at their rear ends by a yoke 19 and at an intermediate point by a brace 20.

A pair of front radius rods 22 extend rearwardly from the outer ends of the front axle 11 and are secured together at their rear ends by a beam 23 which is provided with a ball 24 at its central part. This ball is universally mounted in a suitable socket formed on the lower side of the transmission 43.

A pair of rear radius rods 25 are secured to the outer ends of the rear axle housing 16 and extend diagonally forwardly to the forward end of the torque tube 17 to which they are secured by means of the bolts 26. A pair of rearwardly extending horizontal arms 27 are secured to the rear ends of the radius rods 25 to form extensions thereof, their forward ends serving to clamp the rear axle housing 16 to the rod and their rear ends serving as spring perches. A rear transverse spring 28 is suspended between the rear ends of these arms 27 and a rear cross member 29 is clamped to the center portion of this spring 28 by means of U bolts 30.

It will be noted that the rear spring 28 is not placed directly above the rear axle 16 but rather at a point rearwardly thereof so that the enlarged center portion of the axle will not interfere with the spring or cross member 29. The radius rods 25 and arms 27 form a continuous beam from the outer ends of the spring 28 to the forward end of the torque tube 17. The rear axle being clamped to this beam at a point intermediate of its ends, it thereby supports the rear spring without the introduction of any torsional strains in the rear axle housing, as would be the case if only a pair of spring perches were extended rearwardly from the axle and no radius rods were provided.

Rear chassis frame members 31 extend forwardly and inwardly from the outer ends of the cross member 29 and are joined at their forward ends by a yoke 32 adjacent to the engine frame brace 20. A channel 33 connects the center portions of the members 31 at a point adjacent to the yoke 19. The center portion of the yoke 32 is pivotally connected to the center portion of the channel 20 by means of a pivot pin 34, and likewise the center portion of the yoke 19 is pivotally connected to the center portion of the channel 33 by means of a second pivot pin 35.

From the foregoing it will be seen that I have provided two chassis frames, each of triangular outline and having their bases forming cross frame members and having their apices pivoted together by spaced aligned pivots. This permits the two frames to oscillate on the pivot pins 34 and 35 relative to each other but prevents horizontal or vertical movements of the frames relative to each other. It will, therefore, be noted that any torque reaction set up by the engine 21 will not be transferred to the rear cross member 29.

The outer ends of both cross members 13 and 29 are provided with suitable dampening devices which, in the form shown, consists of a pair of rubber blocks 36 placed on either side of the cross member and clamped thereto by means of a bolt 37 and cup shaped washers 38.

An independent body frame is provided which consists of a pair of horizontal side frame members 39, connected together at their forward ends by a tubular member 40 and at their rear ends by a similar tubular member 41. The member 40 is placed forwardly of the cross member 13 and the member 41 is placed rearwardly of the cross member 29. The side frame members 39 are supported from the outer ends of the cross members 13 and 29 by means of the bolts 37 acting through the rubber blocks 36. The body frame is thus resiliently mounted on both the front and rear cross members and insulated therefrom by the blocks 36. The vehicle body is bolted directly to the body frame and is not connected to the chassis frame members.

The tubular members 18 are used to conduct the exhaust gases from the engine to the rear of the automobile and a pair of mufflers 42 are connected to the forward ends of these tubes for this purpose. Each of these mufflers is connected with a section of the exhaust manifold of the engine so that the exhaust gases pass directly from the engine manifold to the mufflers and then to the forward ends of the tubes 18 by which they are conveyed to the rear of the automobile.

A pair of exhaust pipe extensions 44 are secured in the rear ends of the tubes 18 and extend over the rear axle 16 to a position rearwardly of the rear tubular member 41.

Among the many advantages arising from the use of this construction is the independent action of the various parts of the chassis.

The motor torque reactions are received by the front chassis frame and transmitted mainly to the front spring and do not reach the rear chassis frame or the body frame due to the pivotal connection between the two chassis frame members and the cushion blocks between the chassis frames and the body frame.

Vibration caused by the operation of the engine is also insulated from the body by the cushion blocks.

Still a further advantage results from the fact that the wheels of the vehicle may follow uneven places in the road because the axles may twist relative to each other and the strain of this twist is not transmitted to the body as the two chassis frame members may swing on their pivotal connections relative to each other.

A further advantage results in that the engine frame members are used to conduct the exhaust gases to the rear of the car so that extra exhaust piping is eliminated.

Still a further advantage results in that the rear spring and cross member are placed rearwardly of the enlarged center portion of the rear axle housing to provide clearance for this housing and allow the use of a much lower body frame.

Still a further advantage results in the fact that the mufflers used in connection with my improved device are placed adjacent to the fan and the forward end of the vehicle so that the cooling efficiency of these mufflers is largely increased and the exhaust noise transmitted to the interior of the body of the vehicle is considerably lessened.

Some changes may be made in the arrangement, construction, and combination of the various parts of my improved device without departing from the spirit of my invention and it is my intention to cover by my claims such changes as may reasonably be included within the scope thereof.

I claim as my invention:

1. In a vehicle construction, an engine frame associated with a front cross member, a rear chassis frame associated with a rear cross member, and a body frame resiliently mounted on said cross members, the said engine frame and said rear chassis frame being pivotally connected together by a pair of spaced pivots to thereby permit the said cross members to oscillate relative to each other and to the said body frame.

2. In a vehicle construction, a front axle having a transverse spring and front cross member associated therewith, an engine frame secured to the said front cross member and extending rearwardly therefrom, a rear axle, a transverse spring and rear cross member disposed rearwardly of said rear axle and connected thereto by a pair of offset spring perches, and a pair of members extending forwardly from the said rear cross member, said engine frame and member being pivotally connected by a pair of spaced pivots to permit only a relative oscillating movement therebetween and to prevent interference between the center section of the rear axle and the center section of the rear spring.

3. In a vehicle construction, a rear axle, a torque tube connected therewith, a frame, said frame having a rear frame cross member disposed above and in rear of said rear axle, a transverse spring having its central portion secured to said frame cross member, and a pair of radius rods having their forward ends connected to the forward end of the torque tube and their rear ends connected to the outer ends of said spring and their intermediate portions connected to said rear axle.

4. In a vehicle construction, transverse spring supported front and rear cross members, a pair of overlapping triangular braces extending from the ends of each cross pivotally connected together by a pair of spaced pivots, and a pair of longitudinal frame members resiliently connecting the outer ends of the cross members.

5. In a vehicle construction, spring supported front and rear cross members, overlapping triangular braces extending from the ends of each cross member pivotally connected together by a pair of spaced pivots, and longitudinal frame members resiliently connecting the outer ends of the cross members.

HENRY FORD.